(12) United States Patent
Yazdy

(10) Patent No.: US 8,693,048 B2
(45) Date of Patent: Apr. 8, 2014

(54) SUB-PIXEL GENERATION FOR HIGH SPEED COLOR LASER PRINTERS USING A CLAMPING TECHNIQUE FOR PLL (PHASE LOCKED LOOP) CIRCUITRY

(75) Inventor: Mostafa R. Yazdy, Los Angeles, CA (US)

(73) Assignee: Xerox Corporation, Norwalk, CT (US)

( * ) Notice: Subject to any disclaimer, the term of this patent is extended or adjusted under 35 U.S.C. 154(b) by 1687 days.

(21) Appl. No.: 11/657,204

(22) Filed: Jan. 24, 2007

(65) Prior Publication Data

US 2008/0174348 A1    Jul. 24, 2008

(51) Int. Cl.
| | |
|---|---|
| *G06K 15/12* | (2006.01) |
| *G06F 3/12* | (2006.01) |
| *H04N 1/29* | (2006.01) |
| *H04N 1/40* | (2006.01) |
| *H04N 1/46* | (2006.01) |

(52) U.S. Cl.
USPC ........... 358/1.7; 358/1.15; 358/300; 358/443; 358/530

(58) Field of Classification Search
USPC .......... 327/307, 156, 157; 358/1.7, 1.15, 300, 358/443, 530, 1.2, 1.5, 1.9, 1.13, 301, 302, 358/501
See application file for complete search history.

(56) References Cited

U.S. PATENT DOCUMENTS

| | | | |
|---|---|---|---|
| 5,140,349 A | | 8/1992 | Abe et al. |
| 5,329,252 A | | 7/1994 | Major |
| 5,361,123 A | * | 11/1994 | Yeh et al. ......................... 399/50 |
| 5,471,314 A | * | 11/1995 | Orlicki et al. .................. 358/296 |
| 5,493,374 A | * | 2/1996 | Smith et al. .................... 399/322 |
| 5,502,419 A | * | 3/1996 | Kawasaki et al. ............. 332/109 |
| 5,517,230 A | * | 5/1996 | Lofthus et al. ................. 347/235 |
| 5,530,642 A | * | 6/1996 | Lofthus et al. ................... 700/69 |
| 5,610,646 A | * | 3/1997 | Isaka et al. ..................... 347/131 |
| 5,629,696 A | * | 5/1997 | Kawasaki et al. ............. 341/101 |
| 5,640,131 A | * | 6/1997 | Kawasaki et al. ............. 332/109 |
| 6,133,932 A | * | 10/2000 | Webb et al. .................... 347/232 |
| 6,151,152 A | * | 11/2000 | Neary ......................... 359/216.1 |
| 6,184,916 B1 | * | 2/2001 | Cianciosi ....................... 347/255 |

(Continued)

FOREIGN PATENT DOCUMENTS

EP     1705896 A     9/2006

OTHER PUBLICATIONS

Hanjun Jiang et al., "Optimal Loop Parameter Design of Charge Pump PLLs", The 2002 45th Midwest Symposium on Circuits and Systems, Conference Proceedings, Tulsa, OK, Aug. 4-7, 2002; NY, NY, IEEE, US, vol. 1, Aug. 4, 2002, pp. 344-347, XP010635221 ISBN: 978-0-7803-7523-9.

(Continued)

*Primary Examiner* — Firmin Backer
*Assistant Examiner* — Jonathan Beckley
(74) *Attorney, Agent, or Firm* — Fay Sharpe LLP

(57) ABSTRACT

Methods and apparatus for optimizing the phase lock loop circuitry of sub-pixel clock generators for situations where frequent switching between different system printing speeds, and hence clock frequencies are required. An optimizing circuit is associated with a sub-pixel clock generator for clamping an input voltage to a voltage controlled oscillator controlling clock frequency between a desired range. The clamping circuitry comprises a comparator for detecting when the voltage has moved out of the desired range and then charges or discharges a loop filter circuit controlling the input voltage to the VCO to keep the input voltage within the desired range.

13 Claims, 4 Drawing Sheets

(56) References Cited

U.S. PATENT DOCUMENTS

| | | | |
|---|---|---|---|
| 6,288,574 B1* | 9/2001 | Neary | 327/12 |
| 6,529,055 B1* | 3/2003 | Neary | 327/156 |
| 6,657,488 B1* | 12/2003 | King et al. | 330/9 |
| 6,674,824 B1* | 1/2004 | Chiueh et al. | 375/376 |
| 6,794,946 B2* | 9/2004 | Farjad-Rad | 331/16 |
| 6,940,536 B2* | 9/2005 | Rauch et al. | 347/249 |
| 6,947,515 B2* | 9/2005 | Neary | 375/376 |
| 7,053,684 B1* | 5/2006 | Sen et al. | 327/157 |
| 7,202,717 B2* | 4/2007 | Keaveney et al. | 327/157 |
| 7,429,895 B2* | 9/2008 | Easwaran et al. | 331/16 |
| 2002/0051137 A1 | 5/2002 | Ema et al. | |
| 2005/0057313 A1* | 3/2005 | Keaveney et al. | 331/16 |
| 2006/0215188 A1 | 9/2006 | Yazdy | |
| 2006/0244979 A1 | 11/2006 | Yazdy et al. | |
| 2008/0174794 A1* | 7/2008 | Yazdy | 358/1.7 |

OTHER PUBLICATIONS

European Patent Application No. EP 08 15 0483, European Search Report, The Hague, Mar. 5, 2009.

* cited by examiner

SUB-PIXEL GENERATION FOR HIGH SPEED COLOR LASER PRINTERS USING A CLAMPING TECHNIQUE FOR PLL (PHASE LOCKED LOOP) CIRCUITRY

TECHNICAL FIELD

The present invention relates generally to electrophotographic printing machines, and more particularly, to raster output scanners in electrophotographic printing machines.

BACKGROUND

Generally, the process of electrophotographic printing includes charging a photoconductive member to a substantially uniform potential to sensitize its surface. The charged portion of the photoconductive surface is exposed to a light image from a scanning laser beam or a LED diode that corresponds to an original document or image being reproduced. The effect of the light on the charged surface produces an electrostatic latent image on the photoconductive surface.

After the electrostatic latent image is recorded on the photoconductive surface, the latent image is developed. Two-component and single-component developer materials are commonly used for development. A typical two-component developer comprises a mixture of magnetic carrier granules and toner particles that adhere triboelectrically to the latent image. A single-component developer material is typically comprised of toner particles without carrier particles. Toner particles are attracted to the latent image, forming a toner powder image on the latent image of the photoconductive surface. The toner powder image is subsequently transferred to a copy sheet. Finally, the toner powder image is heated to permanently fuse it to the copy sheet to form the hard copy image.

In color electrophotographic printers, one or more Raster Output-Scanner (ROS) units are positioned adjacent to a moving photoreceptor belt surface or the like and are selectively energized to generate successive image exposures. Each of the latent images is representative of one of a plurality of different color separation images. Development of the color separation latent images and the transfer of the developed image to an output media define a multi-color image. The color separation images may define, for example, yellow, magenta, cyan, and black color images that, upon subtractive combination on the output media, produce a visible representation of the multi-color image. When an observer looks at the output media, the human eye integrates the light reflections from the color component images into shades of color.

For a color imaging cycle, the printer generates a component image exposure for each color component of the desired output image. For full color images, four component images may be generated, one component image for each of the three basic colors and a fourth for black images. Each component image is transferred to the moving photoconductive surface by modulating the light source of an ROS as it moves across the moving photoconductor to selectively discharge the photoconductor in an image-wise pattern. The modulation control of the laser or LED of the ROS is provided by the video data. For each color component image, the value of an image data byte is used to enable or disable the laser or LED that illuminates the photoreceptor for one pixel timing period. If the data value is less than a threshold value, the LED or laser is not operated for one pixel period. If the data value indicates that a pixel is to be generated, then the LED or laser is operated for one pixel period.

An ROS that generates a series of pixels comprising a color component image places the color component image it generates in overlying registration with the other color component images. These overlapping images are composed of a series of closely spaced pixels that are nominally spaced 5 microns apart. When these component images are developed at development stations to transfer toner particles of different colors to the component images, a composite color image is formed. This composite color image is then transferred to an output sheet. Thus, the quality of color image perceived by the observer relies upon the precise registration of the component image pixels.

In some electrophotographic imaging systems, the latent images of the component image are formed and developed on top of one another in a common imaging region of the photoconductor. The latent images generated in the common imaging region may be formed and developed during multiple passes of the photoconductor around a continuous transport path. Alternatively, the latent images can be formed and developed in a single pass of the photoconductor around the continuous transport path. A single-pass system enables multi-color images to be assembled at extremely high speeds. In either type of imaging systems, accurate placement of the color separation image pixels in the latent image is important for image quality.

One problem with the pixels generated by these types of ROS devices is the lack of precision regarding the size and placement of the pixels. Because the entire data byte is mapped to only one value, either an on or off value, only one of two types of pixels may be produced. Therefore, the data bytes for an image may define pixels of different densities, but the ROS is only able to generate a pixel that is either on for the full duration of a pixel clock cycle or off for the same period of time. Consequently, some of the data content for an image is lost in the process of generating a latent image from a set of image data.

Published Application No. 2006/0215188 A1, Sep. 28, 2006, herein incorporated by reference, discloses a method and system for sub-pixel generation in a high speed laser electrophotographic system. The output of the sub-pixel generating circuit disclosed therein as applied to the ROS is officially adjusted for each pixel in order to control pixel size. This system can be advantageously implemented in a full custom mixed-mode (analog/digital) integrated chip (SPG chip). However, such a full-custom chip is optimized for one particular desired printing speed and also comprises for the higher speeds of present electrophotographic laser systems, a rather delicate and expensive custom-made chip circuit.

As alternative printing system speeds may be desired, there is a need for advantageously utilizing the foregoing existing SPG custom chip, but for different speeds, and to avoid having to develop a new full custom specialized integrated chip respectively for each desired speed.

Accordingly, it is desired to utilize an existing SPG chip for different or higher speeds by changing only a few off-chip components that may be associated with the chip so that a system can be utilized which quickly and inexpensively switches between the different printing speeds.

SUMMARY

According to aspects illustrated herein there is provided a switchable ROS driver circuit for an electrophotographic system for selectively switching between a plurality of system printing speeds. A sub-pixel clock generator is tuned to a first reference signal corresponding to a first system printing speed for setting an input voltage at a voltage controlled oscillator ("VCO") to generate a desired frequency for the ROS light source corresponding to the first system printing speed. A clamping circuit is associated with the sub-pixel clock generator for settling jitter and avoiding saturation of the input voltage to the VCO upon applying a second reference signal corresponding to a second system printing speed to the sub-pixel generator. The ROS light source is in operative communication with the sub-pixel clock generator for sub-pixel control of the ROS light source.

Another disclosed feature of the embodiments comprises a method for switching an ROS driver circuit from an electrophotographic system for selective switching of system printing speeds. The first reference signal is applied that corresponds to a first system printing speed, to a pixel clock generator disposed to set an input voltage at a VCO in communication with an ROS light source for generating a first desired frequency corresponding to the first system printing speed. The first reference signal is switched to a second reference signal corresponding to a second reference signal corresponding to a second system printing speed. The input voltage to the VCO is clamped during the switching for settling jitter and avoiding saturation of the input voltage to the VCO. The VCO output corresponding to the second system printing speed frequency is communicated to the ROS light source.

DETAILED DESCRIPTION

Figure 1:
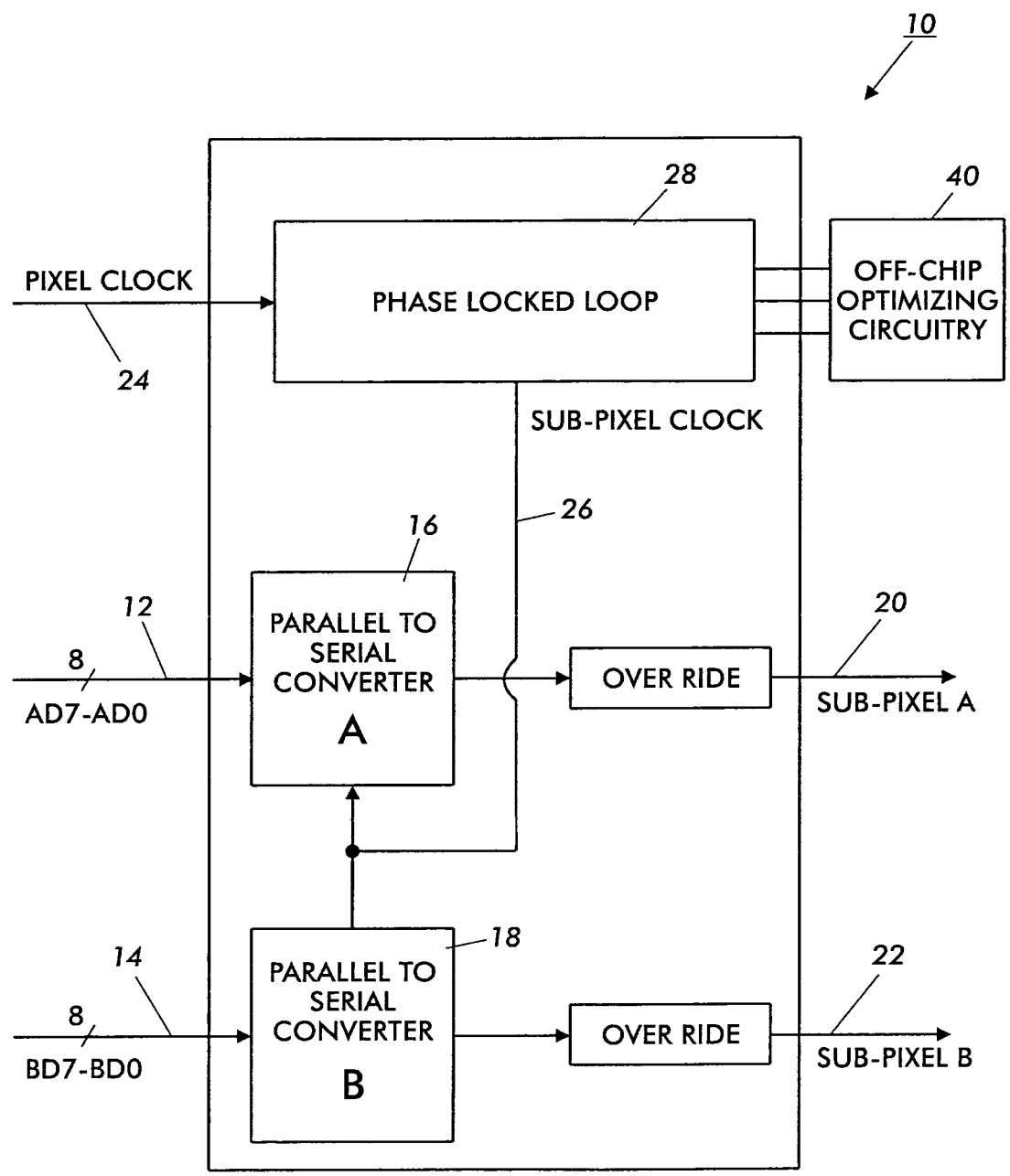
FIG. 1 is a block diagram of a sub-pixel clock generator.

With reference to FIG. 1, a sub-pixel clock generator processor 10 is shown wherein eight-bit signals (in a parallel format called the Video Data A 12 and Video Data B 14 for a dual-channel ROS system) are applied to parallel-to-serial converter circuitry 16,18, respectively, to generate the output signals sub-pixel A 20 and sub-pixel B 22. The output signals are applied to the laser drivers in the ROS to turn on the laser beam. The duration of the laser beam in each on state depends on the width of the output signal pulses. The parallel-to-serial converters 16,18 require an internal clock signal eight times faster than the pixel clock 24 to control the maximum duration of the output pulses for the sub-pixel generation. The internal clock of the converters requires a sub-pixel clock 26 that is generated by the phase lock loop (PLL) circuit 28.

Figure 2:
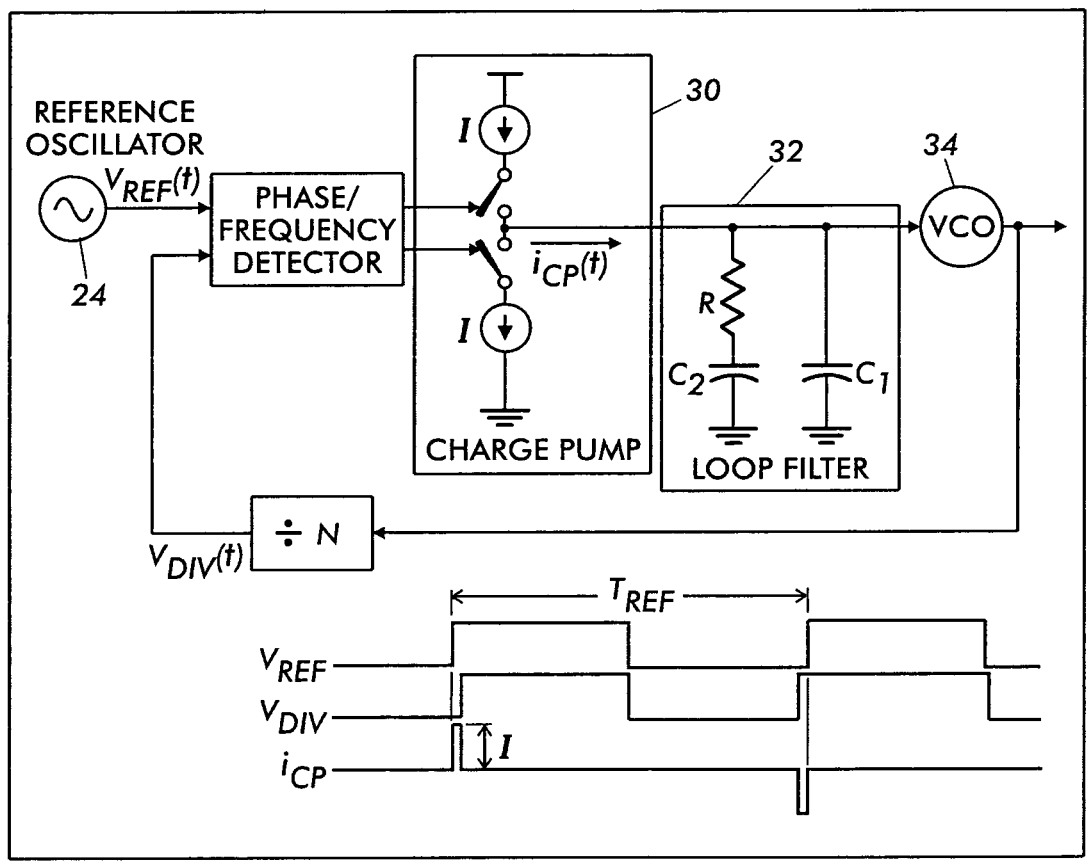
FIG. 2 is a phase locked loop component of the generator of FIG. 1.

With reference to FIG. 2, the PLL part of the SPG chip is optimized for a specific system printing speed by the pixel clock signal 24. For example, a system speed of 100 pages per minute (ppm) may require a pixel clock of 54 MHz. The sub-pixel clock frequency 26 is eight times faster than the pixel clock (432 MHz which is 8×54 MHz). The PLL includes a charge pump circuit 30 and a loop filter circuit 32 for communicating a charge pump current, ($i_{cp}$) to the VCO 34. The charge pump current charges up the capacitors of the loop filter circuit 32 to provide the voltage necessary to set the frequency in the VCO 34.

As noted above, when a change is desired in a system's printing speed, for example from 100 ppm to 135 ppm, there needs to be a change in the charge pump current to adjust the voltage to the VCO to adjust laser pulse durations. For the 135 ppm speed, a clock frequency should be increased to about 68 MHz so that the new "sub-pixel" clock signal 26 would be 524 MHz (8×68 MHz). If the charge pump circuit were to experience a sudden change between the 54 MHz clock and the 68 MHz clock (changing system printing speed from 100 ppm to 135 ppm) such a sudden change in the charge pump current can cause overshoots in the input voltage of the VCO, causing VCO saturation, longer settling time and more jitter.

More particularly, as shown in FIG. 2, the charge pump circuitry 30 provides the current for the loop filter circuit 32 which in turn provides the controlling voltage for the VCO to set the frequency for a VCO clock, which is used as the sub-pixel clock signal 26. For higher speeds, more current from the charge pump circuit must be available for charging up the capacitor in the loop filter 32. However, any increase in this current needs to be effected cautiously because too much current and, more importantly, too sudden a change in the value of the current from the charge pump circuitry, can cause jitter and instability and deteriorate the settling time of the PLL. For example, if the VCO is working between 0 and 5 volts, for a 100 ppm system printing speed, the input voltage to the VCO should be 1.5 volts. To get the desired output frequency for the 135 ppm system printing speed there would be an increase in the voltage value in the adjustment to approximately 2 volts. In transition between the different voltage levels to the VCO it is not uncommon to generate voltage spikes up to the system voltage limit, 5 volts, before there is a settling down to the desirable voltage of 2 volts. Such saturating spikes to the VCO disable the clock frequency to the point that there can be no printing until the proper frequency has been realized after a certain settling time. The jumping up and down of the voltage is called "jitter" and the time that it takes for the jitter to end is called a "settling time".

In order to optimize the PLL operation in situations where frequent switching between different printing speeds occurs, and hence clock frequency changes are required, it is best to make the changes in input voltage to the VCO clamped in a range that would avoid undesirable jitter and oscillator saturation within a reasonable settling time.

Figure 3:
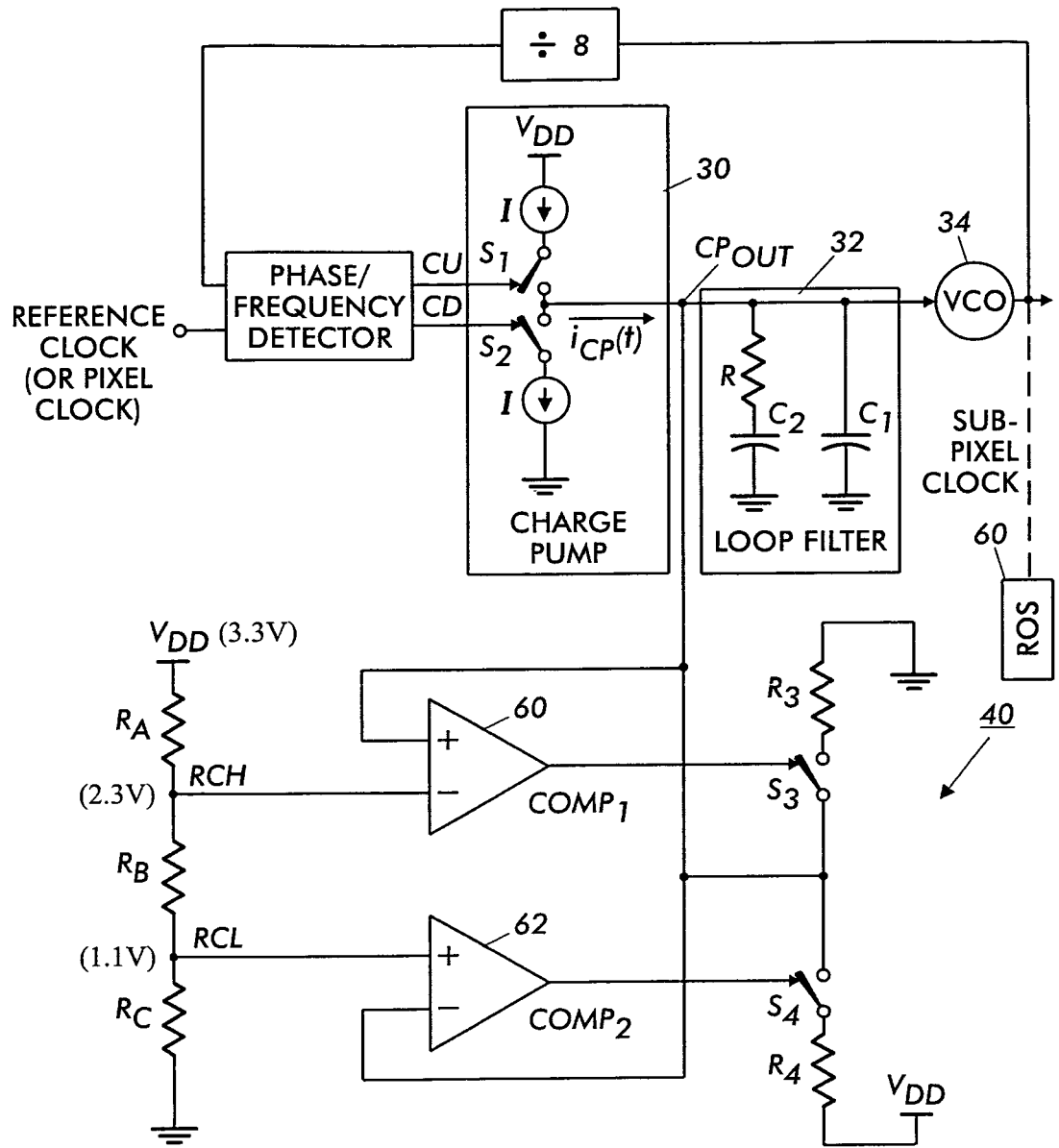
FIG. 3 shows a clamping circuit component for association with the sub-pixel clock generator.
Figure 4:
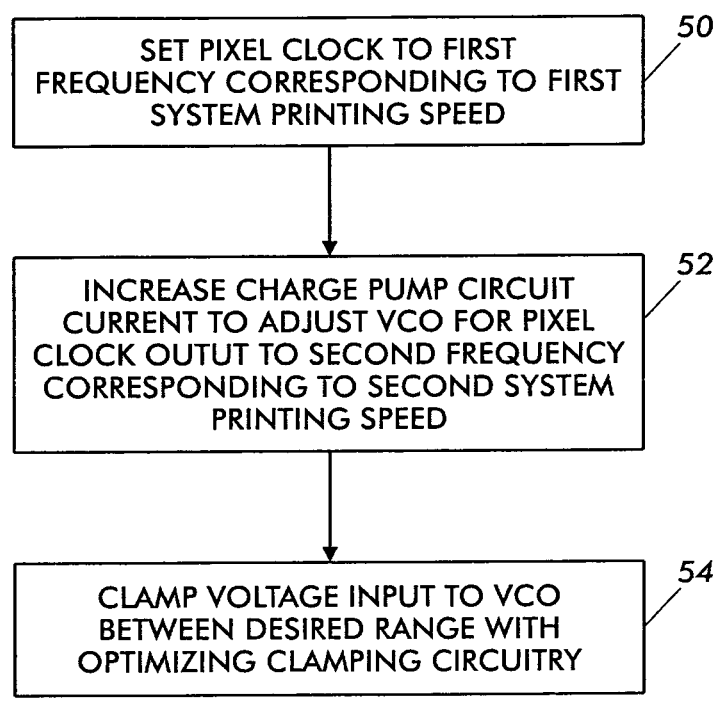
FIG. 4 is a flow chart illustrating a process for optimal switching of charge pump current in a sub-pixel clock generator.

With reference to FIGS. 3 and 4, it can be seen that the off-chip optimizing circuitry 40 interposed between the charge pump 30 and loop filter 32 comprises a comparator circuit wherein when the charge pump current (CPout) is in normal operation, i.e., between 1.1 volts corresponding to a first system printing speed and 2.2 volts corresponding to a second system printing speed, both switches $S_3$ and $S_4$ are off. Thus, for example, if the charge pump requires 10 microamps to generate the 1.1 volts at the VCO for an output frequency corresponding to the first system printing speed circuitry 40, it has no effect. Alternatively, when the charge pump circuit is adjusted to increase an output of approximately 12 microamps to charge the loop filter circuit to approximately 2.2 volts as the input to the VCO for outputting a second frequency corresponding to a second printing system speed, then the abrupt change in voltage can cause a voltage spike resulting in the problems identified above.

More particularly, if the pixel clock is set to the first frequency according to the first system printing speed 50 and then it is abruptly increased 52 to a current to adjust the VCO for a pixel clock output to a second frequency corresponding to a second system printing speed, then the voltage of the VCO may bounce to amounts greater than 2.2 volts or less than 1.1 volts. The clamping circuit 40 precludes the bounce in a range exceeding the 1.1 volt to 2.2 volt desired range. If the charge pump current is such as to cause a spike tending to more than 2.2 volts, as determined by comparator 60 then switch $S_3$ is turned on so that capacitor $C_1$ within the loop circuit can discharge until the charge pump output voltage is less than or equal 2.2 volts. Then switch $S_3$ would turn off. Alternatively, if the charge pump output circuit is less than 1.1 volts as determined by comparator 62, then switch $S_4$ is turned on and capacitor $C_1$ is charged up through resistor $R_4$ until the charge pump output voltage is greater than or equal to 1.1 volts and then switch $S_4$ is turned off. Thus, the charge pump output voltage at the VCO is clamped between a limited range. The values identified are merely exemplary and circuit components and operational performance can be adjusted as needed for a particular printing system.

An advantage of the subject clamping and optimizing circuitry of FIG. 3 is that the SPG chip, initially tuned to a first pixel clock frequency, can have its output safely adjusted through the off-chip clamping circuitry to another pixel clock speed for the desired adjustment of the ROS light source 60. However, other embodiments could comprise the subject clamping technique in a fully integrated on-chip assembly. In general, this technique can be used on-chip or off-chip.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A switchable ROS driver circuit for an electrophotographic system for selective switching between a plurality of system printing speeds, comprising:
   a sub-pixel clock generator for generating output signals applied to laser drivers in a raster output scanner (ROS), the sub-pixel clock generator including:
      a phase locked loop circuit including a charge pump circuit and a loop filter for communicating a charge pump current to a voltage controlled oscillator (VCO) and setting a frequency of the VCO for controlling printing speeds of the electrophotographic system;
      a clamping circuit disposed between the charge pump and loop filter circuits and maintaining the voltage communicated to the VCO between predetermined limits corresponding to first and second printing speeds, the clamping circuit clamping a voltage to the VCO in a range that settles jitter caused by changes in the charge pump current when a printing speed is adjusted; and
   an ROS light source in operative communication with the sub-pixel clock generator for sub-pixel control of the ROS light source, the ROS light source including:
      at least one laser driver generating an image exposure on a photoconductor surface by energizing a laser beam at laser pulse durations each based on the frequency of the VCO;
   wherein the ROS light source adjusts the laser pulse durations based on a signal received from the sub-pixel clock generator, the signal being based on a value of an image data byte.

2. The driver circuit of claim 1 wherein the sub-pixel clock generator comprises a custom mixed-mode integrated chip, and the clamping circuit comprises off-chip component circuitry.

3. The driver circuit of claim 2 wherein the clamping circuit includes a first circuit portion for setting current for the charge pump circuit and a second circuit portion for clamping the input voltage to the VCO within a desired range.

4. The driver circuit of claim 3 wherein the second circuit portion comprises a resistive and analog switch assembly for inhibiting the jitter and the saturation.

5. The driver circuit of claim 2 wherein the clamping circuit is effectively disposed between the loop filter circuit and an input to the VCO.

6. The driver circuit of claim 1 wherein the clamping circuit comprises a comparator for detecting the input voltage to the VCO outside of a preferred range.

7. A method for switching an ROS driver circuit for an electrophotographic system for selective switching of system printing speeds, comprising:
   adjusting an output signal for applying to a laser driver in a raster output scanner (ROS), the adjusting including:
      adjusting a charge pump current from a charge pump circuit in a phase locked loop circuit to a voltage controlled oscillator (VCO) in the phase locked loop circuit, a voltage for setting a frequency of the VCO for controlling a printing speed of the electrophotographic system;
      in response to the adjusting the charge pump current, determining whether the voltage communicated to the VCO falls within predetermined limits each corresponding to a different printing speed;
      in response to the voltage not falling within the predetermined limits, clamping the voltage to the VCO within the predetermined limits;
      using the voltage to set a frequency of the VCO; and,
   energizing a laser beam in the ROS at a laser pulse duration based on the frequency.

8. The method of claim 7 wherein the generating a first desired frequency is executed with an integrated chip and the clamping is executed with off-chip component circuitry.

9. The method of claim 8 wherein the clamping includes setting a current for a charge pump circuit portion of a pixel clock generator and limiting an input voltage to the VCO within a desired range.

10. The method of claim 9 wherein the clamping includes detecting the input voltage to the VCO at an input loop filter circuit, and charging and discharging the loop filter when the input voltage is lower and higher, respectively, than the desired range.

11. A xerographic printing system for selective switching between a plurality of system printing speeds comprising: a sub-pixel clock generator for generating output signals applied to laser drivers in a raster output scanner (ROS), the sub-pixel clock generator including:
   a charge pump circuit for adjusting a charge pump current in response to a desired change in printing speed;
   a clamping circuit associated with the sub-pixel clock generator for settling jitter and avoiding saturation of an input voltage to the VCO, the clamping circuit being adapted to:
      in response to the adjusting the charge pump current, determine whether the voltage communicated to the VCO falls within predetermined limits each corresponding to a different printing speed;
      in response to the voltage not falling within the predetermined limits, clamp the voltage to the VCO within the predetermined limits; and
   a voltage controlled oscillator (VCO) receiving the clamped voltage and using the voltage to set a frequency of the sub-pixel clock generator; and,
   an ROS light source in operative communication with the sub-pixel clock generator for sub-pixel control of the ROS light source, the ROS light source including:

a laser beam being energized at a laser pulse duration based on the frequency.

12. The driver circuit of claim 11 wherein the clamping circuit comprises a comparator for detecting the input voltage to the VCO outside of a preferred range.

13. The driver circuit of claim 12 wherein the clamping circuit discharges a loop filter for reducing the input voltage to the VCO when the input voltage is higher than the preferred range, and charges the loop filter for increasing the input voltage to the VCO when the input voltage is lower than the preferred range.

* * * * *